(12) United States Patent
Seidenfuss

(10) Patent No.: US 6,777,925 B1
(45) Date of Patent: Aug. 17, 2004

(54) INPUT CIRCUIT FOR INDUCTIVE ENGINE SPEED SENSOR

(75) Inventor: Thomas Seidenfuss, Jetzendorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 17 days.

(21) Appl. No.: 10/009,594

(22) PCT Filed: Oct. 6, 2000

(86) PCT No.: PCT/EP00/09798
§ 371 (c)(1),
(2), (4) Date: Jul. 22, 2002

(87) PCT Pub. No.: WO01/35108
PCT Pub. Date: May 17, 2001

(30) Foreign Application Priority Data

Nov. 11, 1999 (DE) .......................................... 199 54 115

(51) Int. Cl.⁷ ............................... G01P 3/46; G01P 3/48
(52) U.S. Cl. ....................... 324/163; 324/166; 324/173; 361/51; 361/239
(58) Field of Search .......................... 361/239, 51, 229; 324/161, 163, 166, 173; 340/441, 670.072; 702/142, 145

(56) References Cited

U.S. PATENT DOCUMENTS

| | | | | |
|---|---|---|---|---|
| 3,990,417 A | * | 11/1976 | Tershak ................. | 123/406.66 |
| 4,226,219 A | * | 10/1980 | Olmstead ............... | 123/406.53 |
| 4,363,979 A |   | 12/1982 | Hoenig et al. | |
| 4,365,298 A | * | 12/1982 | Sibley et al. ................. | 377/28 |
| 4,575,677 A | * | 3/1986  | Dennis ........................ | 324/161 |
| 4,902,970 A | * | 2/1990  | Suquet ........................ | 324/173 |
| 5,101,155 A |   | 3/1992  | Oehler et al. | |
| 5,231,351 A | * | 7/1993  | Kordts et al. ................ | 324/166 |
| 5,450,008 A |   | 9/1995  | Good et al. | |
| 5,451,867 A | * | 9/1995  | Loreck et al. ................ | 324/166 |
| 5,517,431 A | * | 5/1996  | Pattantyus et al. ........... | 702/116 |
| 5,714,879 A |   | 2/1998  | Schmitt | |
| 6,456,085 B1 | * | 9/2002 | Dietl et al. .................. | 324/509 |

FOREIGN PATENT DOCUMENTS

| | | |
|---|---|---|
| DE | 2948198 A1 | 6/1981 |
| DE | 3605995 A1 | 8/1987 |
| DE | 3930895 A1 | 3/1991 |
| DE | 19512613 A1 | 10/1996 |
| GB | 2186979 A | 8/1987 |

* cited by examiner

Primary Examiner—N. Le
Assistant Examiner—Darrell Kinder
(74) Attorney, Agent, or Firm—Crowell & Moring LLP

(57) ABSTRACT

A circuit for inputting and processing a signal from a speed sensor element, includes a comparator having first and second input terminals and first and second input circuits connected to receive the signal. The first input circuit is connected to a first input terminal of said comparator, and the second input circuit is connected to a reference voltage and to the second input terminal of said comparator. A switchable voltage divider circuit interruptibly connecting a voltage divider circuit for reducing an amplitude of the signal on said first input circuit; and a microprocessor is connected to receive and process an output of the comparator and to determine a speed value based thereon. The microprocessor controls switchable voltage divider based on the magnitude of determined vehicle speed.

9 Claims, 1 Drawing Sheet

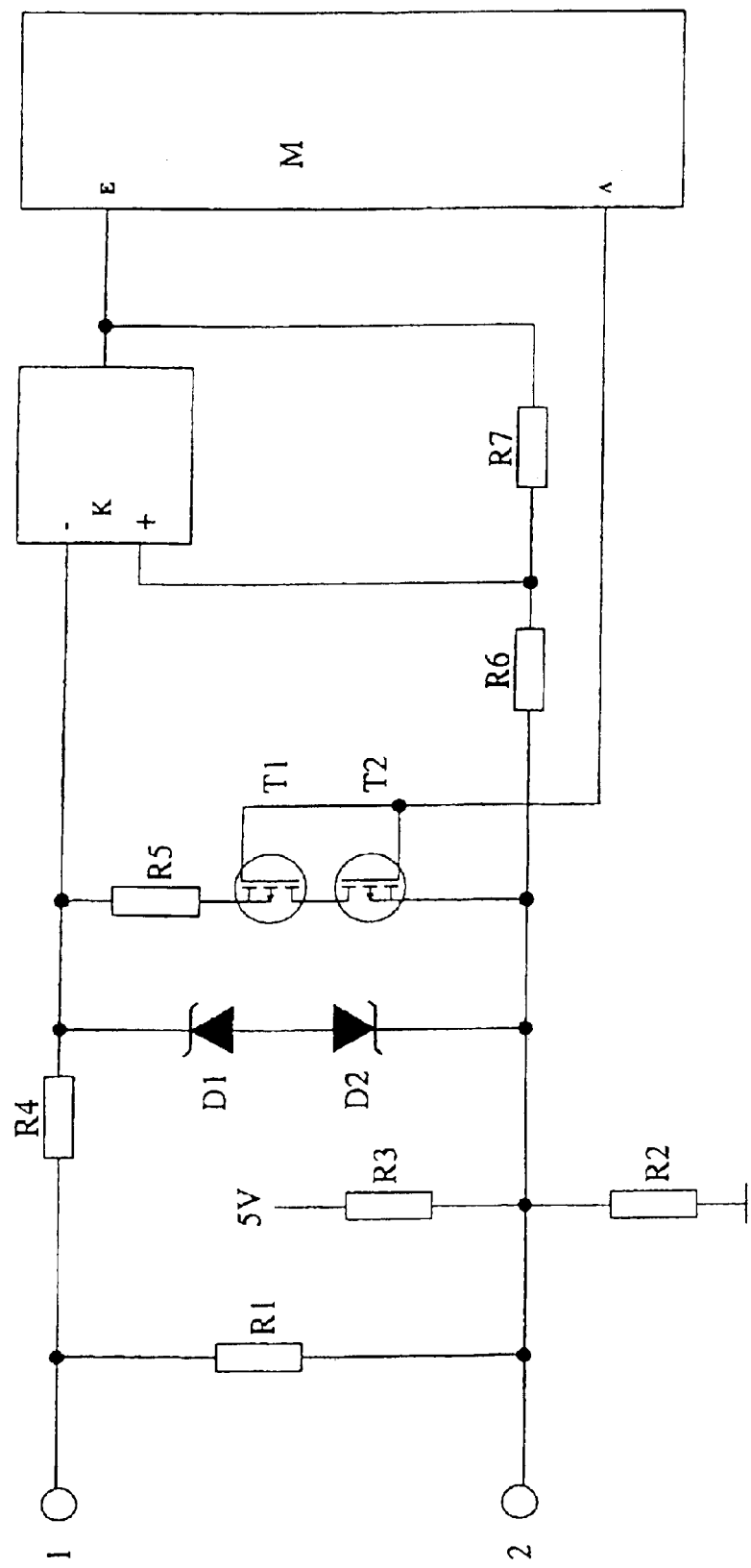

INPUT CIRCUIT FOR INDUCTIVE ENGINE SPEED SENSOR

This application claims the priority of PCT International Application No. PCT/EP00/09798, filed 6 Oct. 2000 and German patent document 199 54 115.9, filed Nov. 11, 1999, the disclosure of which is expressly incorporated by reference herein.

BACKGROUND AND SUMMARY OF THE INVENTION

The invention relates to an input circuit for a signal from an inductive speed sensor.

Many internal combustion engines use transmitter wheels with inductive sensors to determine, for example, the position of the crankshaft. Not only are inductive sensors of this type rugged and usable at very high temperatures, they are also extremely inexpensive. However, the amplitude of the signal depends on the speed, covering a range from a few millivolts to more than 100 volts. Electronic circuits are normally used in order to be able to detect low amplitudes at low speeds, on the one hand, while reaching, on the other hand, the highest possible level of noise immunity during normal engine operation, i.e. in the presence of high amplitudes. The electronic circuits either divide the existing sensor voltage in one or more stages, or they switch the switching thresholds of evaluating comparators over. Both of these methods measure the average level of the sensor voltage and effect the switch-over of their evaluation dependent on the latter.

A disadvantage of this process is that it necessarily involves a relatively high level of complex circuitry in order to determine the average amplitude of the signal, to switchover the thresholds or voltage dividers, to provide a hysteresis for the switch-over and to prevent undesirable additional edges that may occur in the more sensitive area during a switch-back. Therefore, specially designed and costly so-called ASICs are often used.

One object of the present invention is to provide an input circuit of the kind described at the outset that can be used to achieve a high degree of input sensitivity during the start-up phase and a good signal-to-noise ratio during normal engine operation utilizing the simplest means.

This and other objects and advantages are achieved by the input circuit according to the invention, in which a voltage divider for a signal amplitude is no longer switched over on the basis of an average sensor signal value but on the basis of the speed. A precise analysis of the above-mentioned problem revealed that the low amplitudes occur, for the most part, only during the start-up process (that is, when the engine starter rotates at less than 100 rpm). But once the engine starts, the idling speed is reached within a very short time. Idling speeds, however, are within a range of approximately 500 to 1,000 rpm. At this speed, the amplitude of the transmitter signal reached approximately 10 times the initial amplitude. The amplitude, in turn, changes by a maximum factor of ten across the entire remaining speed range. The invention takes advantage of the dependence of the signal amplitude on speed.

Specifically, a micro-controller can provide the speed to the engine control, where this dimension is already present. The speed thresholds and the switching hysteresis are also easily adjustable with the present invention.

Furthermore, if taking into account that the initial sensitivity level is necessary only during the start-up phase, a simple switch-over threshold will be enough to ensure sufficient noise immunity during normal engine operation.

Other objects, advantages and novel features of the present invention will become apparent from the following detailed description of the invention when considered in conjunction with the accompanying drawings.

BRIEF DESCRIPTION OF THE DRAWINGS

The single FIGURE of the drawing depicts an input circuit according to the invention.

DETAILED DESCRIPTION OF THE DRAWINGS

Referring to the FIGURE, the input circuit according to the invention is comprised of two circuit inputs (or connector pins) 1, 2, to which an inductive transmitter (not shown) can be connected. The two circuit inputs 1 and 2 are loaded via a resistor R1.

The circuit input 2 is connected to a voltage divider, comprised of the resistors R2 and R3, with the resistor R2 connecting the circuit input 2 to the ground, and the resistor R3 being connected to a constant voltage of 5V. The reference level of the transmitter is raised by way of the voltage divider, which is comprised of the resistors R2 and R3; as a result, it is possible to detect negative amplitudes using a comparator K.

The circuit input 1 is connected to a first input (−) of the comparator K via a resistor R4. Two Zener-diodes D1 and D2, connected opposite in relation to each other, are arranged between the resistor R4 and the second circuit input 2; in conjunction with the resistor R4, they protect the comparator K from an input voltage that is too high.

The second input (+) of the comparator K is connected to the circuit input 2 via a resistor R6, and to the output of the comparator K via a resistor R7. The two resistors R6 and R7 define a switching hysteresis.

The output of the comparator K is connected to a microcontroller M (input E) which is used to evaluate the transmitter signal, and which in turn, uses this transmitter information to control the engine.

Another resistor R5 and two p-channel MOS (metal-oxide semiconductor) field-effect transistors T1 and T2 are connected between the resistor R4 and the circuit input 2. Consequently, the first input (−) of the comparator K is connected via the resistor R4 to the circuit input 1 and via the combination of the resistor R5 and the two MOS field-effect transistors T1 and T2 to the circuit input 2. Using the combination of the components R4, R5, T1 and T2, it is possible to realize a switchable voltage divider and, therefore, a controllable amplitude reduction at the comparator K.

The two MOS field-effect transistors T1 and T2 are necessary because of the negative sensor voltages; and they are both arranged in series and aligned in different switching directions. The inputs of the two MOS field-effect transistors T1 and T2 are connected to an output A of the microcontroller M and controlled by the latter. In the present case, the inductive sensor supplies +/−1.3 volts at approximately 100 rpm. At 1,000 rpm it generates +/−12.7 volts. The switching threshold of the comparator is at approximately +/−1.2 volts. If resistance values of 51.1 kΩ are used for R4 and of 11.5 kΩ for R5, the resulting switching thresholds are higher by a factor of 5 (or approximately +/−6 volts). This threshold provides a good signal-to-noise ratio.

If a vehicle in which the device is installed is started up and current is supplied to the micro-controller M, latter initially switches the two MOS field-effect transistors T1 and T2 via its output pin A to a high-impedance state. Thus, the sensor signal originating from the inductive sensor or transmitter (not shown) is applied, undamped, at the comparator K. High amplitudes, however, are limited by way of the two diodes D1 and D2.

The micro-controller M evaluates the digitized signal from the comparator K and emits a signal if the established speed threshold is exceeded. This causes the micro-controller M to switch the MOS field-effect transistors T1 and T2 to a low-impedance level, so that the sensor signal at the comparator K is reduced by the then-active voltage divider consisting of the resistors R4 and R5. The speed determination is now less sensitive with respect to noise in the sensor signal. The resistors—as mentioned above—are selected in such a way that the signal level at the comparator K is sufficient for safe switching even under the poorest conditions. It is beneficial if the change-over speed is below the no-load speed in order to prevent any back and forth switching while the engine is running.

The present invention ensures a high input sensitivity during the start-up phase and a good signal-to-noise ratio during engine operation using the simplest means. Significant cost savings are realized in comparison to a conventional solution that uses a so-called ASIC.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An input circuit for receiving and processing signals from an inductive speed sensor, comprising:
   a comparator;
   a switchable voltage divider which includes first and second resistors; and
   first and second circuit inputs each of which is connected to an input of the comparator for evaluating signals from the inductive speed sensor and to the switchable voltage divider; wherein
   the first circuit input is connected via the first resistor to a first input of the comparator, and the second circuit input is connected via the second resistor, which is disconnectable by a switching device, to the first input of the comparator as well;
   the switching element is switchable, depending on speed detected by the speed sensor such that, if the speed value is above a predetermined speed, the second resistor is connected, and, if the speed value is below the predetermined speed, the second resistor is disconnected from the second circuit input.

2. The input circuit as claimed in Claim 1, wherein a micro-controller of the engine control is used as a control device.

3. The input circuit as claimed in claim 1, further comprising a voltage divider comprised of two further resistors, one of said further resistors connecting the second circuit input to a preset constant voltage, and the other connecting the second circuit input to ground.

4. The input circuit as claimed in claim 1, further comprising a resistor that connects the second input of the comparator to the second circuit input, and a resistor that connects the second input of the comparator (K) to its output.

5. The input circuit as claimed in claim 1, further comprising a pair of Zener-diodes connected with opposite polarities between the first and the second circuit inputs.

6. The input circuit as claimed in claim 1, wherein the switching element comprises at least one transistor that is connected to a control devise which blocks the at least one trasistor at low speed and switches it to a low impedance at high speed.

7. The input circuit as claimed in claim 6, wherein the at least one transistor is a p-channel MOS field-effect transistor.

8. The input circuit as claimed in claim 6, wherein said at least one transistor comprises two transistors that are arranged in different switching directions.

9. A circuit for inputting and processing a signal from a speed sensor element, comprising:
   a comparator having first and second input terminals;
   first and second input circuits connected to receive said signal, said first input circuit being connected to a first input terminal of said comparator, and said second input circuit being connected to a reference voltage and to said second input terminal of said comparator;
   a switchable voltage divider circuit interruptible connecting a voltage divider circuit for reducing an amplitude of the signal on said first input circuit; and
   a microprocessor connected to receive and process an output of said comparator and for determining a speed value based thereon;
   wherein said microprocessor controls switching said switchable voltage divider based on a magnitude of determined vehicle speed.

* * * * *